US007472177B2

(12) United States Patent
Bose

(10) Patent No.: US 7,472,177 B2
(45) Date of Patent: Dec. 30, 2008

(54) SYSTEM AND METHOD FOR SELECTING OF VERSIONS FOR SNMP COMMUNICATION

(75) Inventor: Vaijayanti Bose, San Jose, CA (US)

(73) Assignee: Nokia Inc., Irving, TX (US)

( * ) Notice: Subject to any disclaimer, the term of this patent is extended or adjusted under 35 U.S.C. 154(b) by 495 days.

(21) Appl. No.: 10/875,862

(22) Filed: Jun. 23, 2004

(65) Prior Publication Data

US 2006/0015587 A1    Jan. 19, 2006

(51) Int. Cl.
 *G06F 15/177* (2006.01)
(52) U.S. Cl. .......................... 709/220; 700/90; 709/223
(58) Field of Classification Search .................. 717/100; 707/513, 500; 709/238, 250, 223, 249, 220; 700/90; 726/5; 345/772
See application file for complete search history.

(56) References Cited

U.S. PATENT DOCUMENTS

| | | | |
|---|---|---|---|
| 5,951,649 A | | 9/1999 | Dobbins et al. |
| 5,999,740 A * | | 12/1999 | Rowley ...................... 717/173 |
| 6,009,274 A * | | 12/1999 | Fletcher et al. ............. 717/173 |
| 6,389,464 B1 * | | 5/2002 | Krishnamurthy et al. .... 709/220 |
| 7,127,527 B1 * | | 10/2006 | Greenwalt et al. .......... 709/249 |
| 7,237,239 B1 * | | 6/2007 | Goel et al. .................. 717/170 |
| 2001/0027487 A1 * | | 10/2001 | Ruping et al. ............... 709/229 |
| 2002/0002567 A1 * | | 1/2002 | Kanie et al. ................. 707/513 |
| 2002/0019864 A1 | | 2/2002 | Mayer |
| 2003/0018772 A1 * | | 1/2003 | Meandzija et al. .......... 709/223 |
| 2003/0167373 A1 * | | 9/2003 | Winters et al. .............. 711/103 |
| 2004/0010576 A1 * | | 1/2004 | Hyndman et al. ........... 709/223 |
| 2004/0153966 A1 * | | 8/2004 | Richmond et al. .......... 715/509 |
| 2004/0250072 A1 * | | 12/2004 | Ylonen ....................... 713/170 |
| 2007/0130218 A1 * | | 6/2007 | Blumenau ................... 707/201 |

OTHER PUBLICATIONS

Internetworking Technologies Handbook, Simple Network Management Protocol, p. 56-1.*
Notification of Transmittal of the International Search Report and the Written Opinion of the International Searching Authority, or the Declaration dated Mar. 15, 2006, 8 pages.
J. Case et al., "A Simple Network Management Protocol (SNMP)", Network Working Group, RFC 1157, May 1990, pp. 1-36.

(Continued)

*Primary Examiner*—Kidest Bahta
(74) *Attorney, Agent, or Firm*—Squire, Sanders & Dempsey L.L.P.

(57) ABSTRACT

A system and method are directed towards enabling and/or disabling a selection of a version of a network management protocol, such as SNMP. When a networking system is configured using an earlier version of SNMP, such as version 1 or 2, and is to be reconfigured to employ a later version such as version 3, certain options are to be reconfigured. Such options for example, include usage of a community string. When the networking system is to be configured back to the earlier version, the options are again reconfigured. The present invention enables an administrator of the computing system to manage such changes, in part, by abstracting the switching details, without the need to track a progression of events. Moreover, a state of the versions is tracked, such that if the networking system is switched back to version 1 or 2, the last configured community string value is restored.

22 Claims, 5 Drawing Sheets

OTHER PUBLICATIONS

J. Case et al., "Introduction to Community-based SNMPv2", Network Working Group, RFC 1901, Jan. 1996, pp. 1-8.

J. Case et al., "Structure of Management Information for Version 2 of the Simple Network Management Protocol (SNMPv2)", Network Working Group, RFC 1902, Jan. 1996, pp. 1-40.

J. Case et al., "Conformance Statements for Version 2 of the Simple Network Management Protocol (SNMPv2)", Network Working Group, RFC 1904, Jan. 1996, pp. 1-24.

J. Case et al., "Protocol Operations for Version 2 of the Simple Network Management Protocol (SNMPv2)", Network Working Group, RFC 1905, Jan. 1996, pp. 1-24.

J. Case et al., "Textual Conventions for Version 2 of the Simple Network Management Protocol (SNMPv2)", Network Working Group, RFC 1903, Jan. 1996, pp. 1-23.

J. Case et al., "Transport Mappings for Version 2 of the Simple Network Management Protocol (SNMPv2)", Network Working Group, RFC 1906, Jan. 1996, pp. 1-13.

J. Case et al., "Management Information Base for Version 2 of the Simple Network Management Protocol (SNMPv2)", Network Working Group, RFC 1907, Jan. 1996, pp. 1-20.

J. Case et al., "Coexistence between Version 1 and Version 2 of the Internet-standard Network Managment Framework", Network Working Group, RFC 1908, Jan. 1996, pp. 1-10.

K. McCloghrie, "An Administrative Infrastructure for SNMPv2", Network Working Group, RFC 1909, Feb. 1996, pp. 1-19.

G. Waters, "User-based Security Model for SNMPv2", Network Working Group, RFC 1910, Feb. 1996, pp. 1-44.

M. Rose, "A Convention for Defining Traps for use with the SNMP", Network Working Group, RFC 1215, Mar. 1991, pp. 1-9.

M. Rose, "SNMP MUX Protocol and MIB", Network Working Group, RFC 1227, May 1991, pp. 1-13.

G. Carpenter et al., "SNMP-DPI Simple Network Management Protocol Distributed Program Interface", Network Working Group, RFC 1228, May 1991, pp. 1-50.

F. Kastenholz, "SNMP Communications Services", Network Working Group, RFC 1270, Oct. 1991, pp. 1-11.

D. Harrington et al., "An Architecture for Describing SNMP Management Frameworks", Network Working Group, RFC 2271, Jan. 1998, pp. 1-56.

J. Case et al., Message Processing and Dispatching for the Simple Network Management Protocol (SNMP), Network Working Group, RFC 2272, Jan. 1998, pp. 1-39.

D. Levi et al., "SNMPv3 Applications", Network Working Group, RFC 2273, Jan. 1998, pp. 1-70.

U. Blumenthal et al., User-based Security Model (USM) for version 3 of the Simple Network Management Protocol (SNMPv3), Network Working Group, RFC 2274, Jan. 1998, pp. 1-76.

B. Wijnen et al., View-based Access Control Model (VACM) for the Simple Network Management Protocol (SNMP), Network Working Group, RFC 2275, Jan. 1998, pp. 1-36.

* cited by examiner

*SNMP CONFIGURATION*

308 { Home Top Up Apply Save Help Logout

Enable SNMP Daemon ● Yes ○ No } 302

SNMP Version: | V1/V2 ▼ | ~ 304

Community Strings:

Current Read-only
 community strings: *public*

Disable: ○
 Read-only community string: [ ]
 Read-write community string: [ ]

SYSTEM AND METHOD FOR SELECTING OF VERSIONS FOR SNMP COMMUNICATION

FIELD OF THE INVENTION

The invention relates generally to computing network management, and more particularly but not exclusively to a method and system for selecting a version of a network management protocol, such as Simple Network Management Protocol (SNMP).

BACKGROUND OF THE INVENTION

In today's networking infrastructures, there is often a need to manage interconnecting devices, such as switches, routers, and the like. Such management is often performed remotely from the interconnecting devices, and may often be performed at a central location.

Management of the interconnecting devices may include any of a variety of activities, such as managing faults, managing a configuration of the interconnecting devices, managing network utilization, managing performance, managing security of the interconnecting devices, and the like. There are a variety of network management protocols that may be employed to assist in performing these activities. For example, Open Systems Interconnection (OSI) developed Common Management Information Protocol (CMIP) as an application layer protocol to support the above mentioned management areas. The Internet community also developed a network management protocol, called Simple Network Management Protocol (SNMP).

The SNMP network management protocol has evolved from its original configuration. In particular, SNMP now has several versions available (e.g., v1, v2, and v3), with more versions expected to follow. Each version may include differences in how they operate, as well as in a set of parameters that may be selected by an administrator, and the like. For example, SNMP v1 and v2 protocols employ community strings for authentication, whereas, SNMP v3 employs a user identifier (e.g., userid) for authentication and further enables the administrator to specify encryption of data. In some networking infrastructures there may be a desire to seamlessly employ various versions of the network management protocol based on a given situation. Thus, it is with respect to these considerations and others that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein:

FIG. 3 shows one embodiment of a version selection interface;

DETAILED DESCRIPTION OF THE INVENTION

Figure 1:
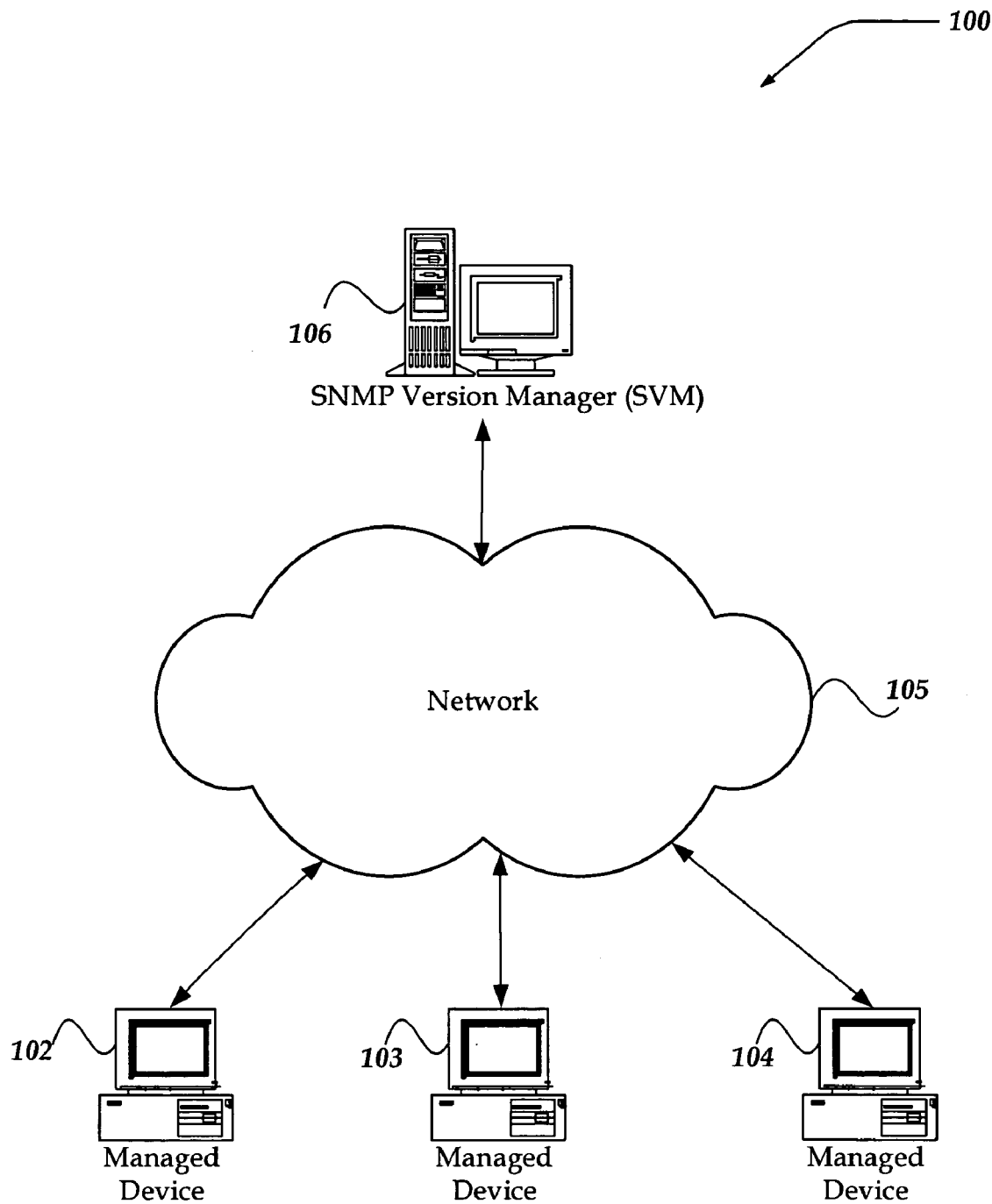
FIG. 1 shows a functional block diagram illustrating one embodiment of an environment for practicing the invention.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Briefly stated, the invention is directed towards a system, apparatus, and method for enabling and/or disabling a selection of a version of a network management protocol, such as SNMP. When a networking system is configured using a version of SNMP, such as version 1 or 2, and is to be reconfigured to employ another version such as version 3, certain options are to be reconfigured. Such options for example, may include usage of a community string and the like. When the networking system is to be configured back to the earlier version, the options are again reconfigured. The invention enables an administrator of the networking system to manage such changes, in part, by abstracting the switching details, without a need by the administrator, and the like, to track a progression of events.

In one embodiment, a toggle mechanism has been included employing a graphical user interface (GUI). The GUI may be web-based, such as displayable through a browser, and the like. Use of the toggle mechanism removes or displays information relevant to that particular SNMP version selected. In another embodiment, a command is included that enables determination of which SNMP version is selected. For example, if SNMP v1/v2 is selected, the configured community string information and fields to manage the community string are made available. If, for example, SNMP v3 is selected, the community string information is made unavailable, and non-viewable. Also, any SNMP v1/v2 queries may be rejected. Security related information, as well as virtually any version dependent information may be made selectively available by employing the invention.

Moreover, a state of the version may also be tracked, such that if the networking system is switched from, say, SNMP v3 back to SNMP v1/v2, and the like, the last configured community string value may be restored and employable for SNMP v1/v2 queries.

Although the invention is described as enabling the selection of various versions of SNMP, the invention is not so limited. For example, the invention may be employed to enable selection of a variety of applications, including another networking management protocol, a version of another software application, and the like.

Illustrative Environment

FIG. 1 shows a functional block diagram illustrating one embodiment of operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes managed devices 102-104, network 105, and SNMP Version Manager (SVM) 106. Network 105 enables communication between SVM 106 and managed devices 102-104.

Generally, managed devices 102-104 may include virtually any networking device capable of connecting to another computing device to send and receive information, including routing information, and the like. Managed devices 102-104 may be configured for example, to operate as a router, access server, switch, bridge, hub, computing host, printer or another peripheral device, gateway, and the like. Thus, the set of devices may include devices that typically connect using a wired communications medium such as personal computers, multiprocessor systems, microprocessor-based or programmable consumer electronics, network PCs, and the like. The set of such devices may also include devices that typically connect using a wireless communications medium such as radio frequency (RF) devices, infrared (IR) devices, integrated devices combining one or more of the preceding devices, or virtually any mobile device, and the like. Similarly, managed devices 102-104 may be any device that is capable of connecting using a wired or wireless communication medium such as a portable computer, and any other device that is equipped to communicate over a wired and/or wireless communication medium.

Managed devices 102-104 may further include an agent, and the like, that is configured to collect and store management information and to make this information available to SVM 106. The management information may be stored in a database, file, spreadsheet, and the like. Furthermore, the agent may keep track of the management information in a structure, such as a hierarchical tree, hash table, and the like, that may include objects to be managed, monitored, and the like. The management information may include any of a variety of information employable to enable SVM 106 to manage faults, manage a configuration of the managed device, manage network utilization, manage performance, manage security of the managed device, and the like. In one embodiment, the agent is configured to receive information associated with which version of network management protocol to employ.

The agent may further listen for requests for the management information from SVM 106. The agent may translate the management information into a form that is compatible with a selected networking management protocol for SVM 106. In one embodiment, managed devices 102-104 employ SNMP to manage and communicate the management information. As such, the agent may operate substantially similar to an SNMP agent. However, the invention is not so limited, and other protocols may be employed, including CMIP, High-Level Entity Management Systems (HEMS) protocols, and the like.

Additionally, the agent may be configured to retrieve and/or modify additional information to provide an alert to SVM 106. For example, the agent may provide an alert such as an unsolicited trap message, and the like, when a problem arises, an attempt to violate the agent is detected, and the like.

Moreover, managed devices 102-104 may further include a client application that is configured to enable it to perform other actions, including operate as a router, access server, bridge, switch, peripheral device, and the like.

Although managed devices 102-104 are illustrated as distinct from network 105, this need not be the case. Clearly, one or more of managed devices 102-105 may be included within network 105, without departing from the scope of spirit of the invention.

Network 105 is configured to couple managed devices 102-104, and the like, with each other, and to SVM 106. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for mobile devices with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 105 includes any communication method by which information may travel between managed devices 102-104 and SVM 106, and the like.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

SVM 106 is described in more detail below in conjunction with FIG. 2. Briefly, however, SVM 106 includes virtually any network device configured to control and monitor a monitored device, such as monitored devices 102-104, and the like. As such, SVM 106 may be implemented on a variety of computing devices including personal computers, desktop computers, multiprocessor systems, microprocessor-based devices, network PCs, servers, network appliances, and the like.

SVM 106 may include a network manager, such as an SNMP manager, and the like, that enables it to provide a central management point, and administrator interface to communicate with managed devices 102-104. The administrator interface may further enable an administrator, and the like, to select a network management protocol, a version of the network management protocol, select parameters, options, and the like, based, in part, on the selected version, and the like. SVM 106 may communicate information associated with the selected version to a managed device, such as managed devices 102-105. SVM 106 may employ a process substantially similar to process 500 described below in conjunction with FIG. 5 for managing versions of the network management protocol. Moreover, SVM 106 may employ an administrator interface substantially similar to those illustrated in FIGS. 3-4. SVM 106, however, is not constrained to these administrator interfaces, and/or process. For example, SVM 106 may employ a command line interface (CLI), an application interface, applet, script, and the like, to select and manage versions of a network management protocol, and the like.

Illustrative Server Environment

Figure 2:
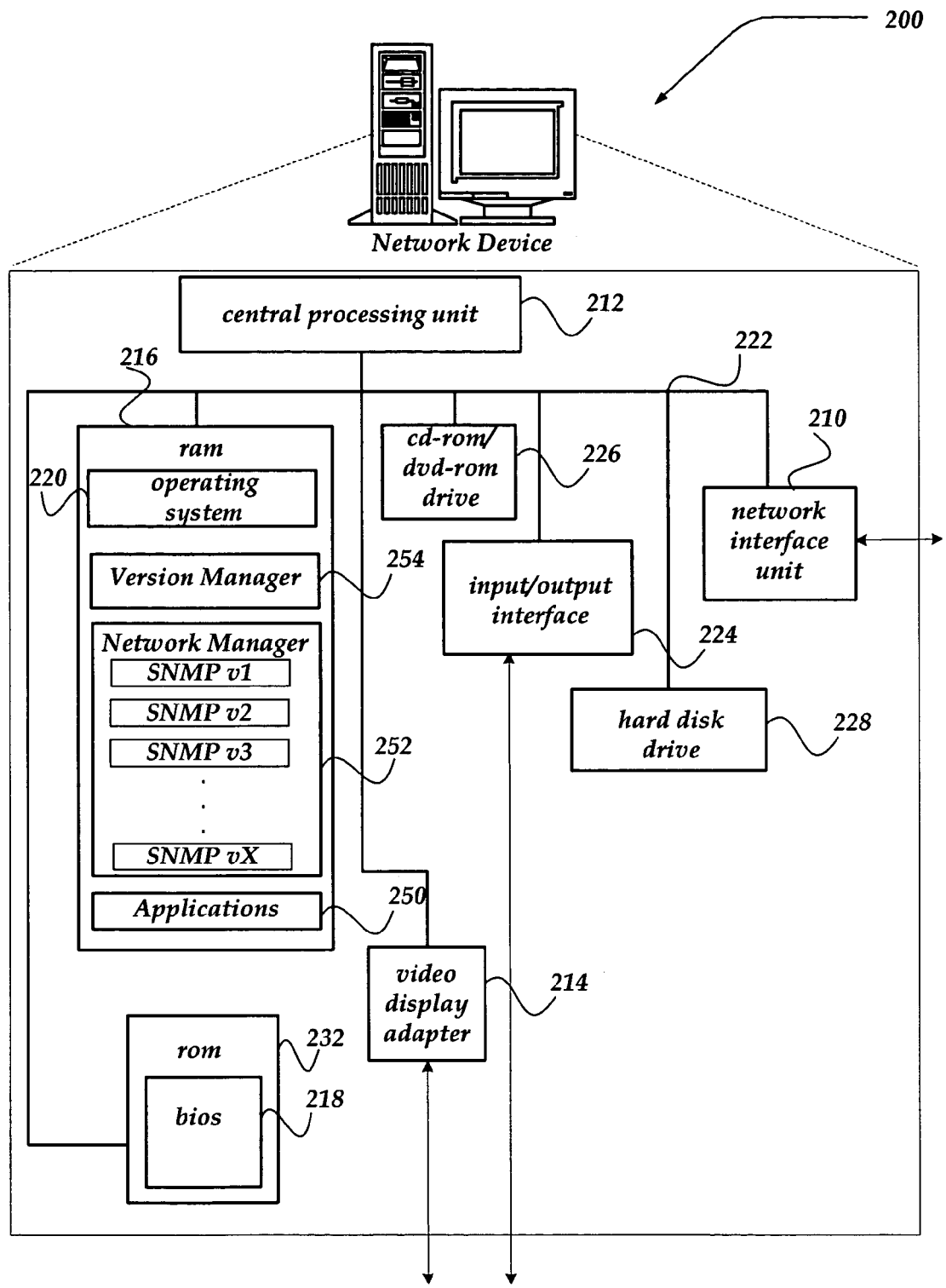
FIG. 2 shows one embodiment of a network device that may be included in a system implementing the invention.

FIG. 2 shows one embodiment of a network device, according to one embodiment of the invention. Network device 200 may include many more components than those shown. The components shown, however, are sufficient to disclose an illustrative embodiment for practicing the invention. Network device 200 may represent, for example, SVM 106 of FIG. 1.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, such as network 105 in FIG. 1, via network interface unit 210, which is constructed for use with various communication protocols including the TCP/IP protocols. For example, in one embodiment, network interface unit 210 may employ a hybrid communication scheme using both TCP and IP multicast with a client device, such as managed devices 102-104 of FIG. 1. Network interface unit 210 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, graphics programs, database programs, word processing programs, HTTP programs, user interface programs, various security programs, and so forth. Mass storage may further include applications such as network manager 252 and version manager 254.

In one embodiment, network manager 252 is configured to operate as an SNMP network manager, substantially consistent with such implementations as may be described in Request for Comments (RFC) 1157, 1213-1270, 1901-1910, and 2271-2275, which are hereby incorporated by reference. In another embodiment, network manager 252 is configured to enable different versions of SNMP depending on information provided from version manager 254. Thus, network manager 252 may be arranged to enable SNMP v1/v2 protocol, SNMP v3 protocol, SNMP vX protocol, and the like, where X may be virtually any version of SNMP beyond v3. Although network manager 252 is illustrated with subcomponents, SNMP v1-vX, the invention is not so constrained. For example, SNMP v1-vX components may be distinct components within network device 200, be distributed across multiple network devices, and the like.

Figure 4:
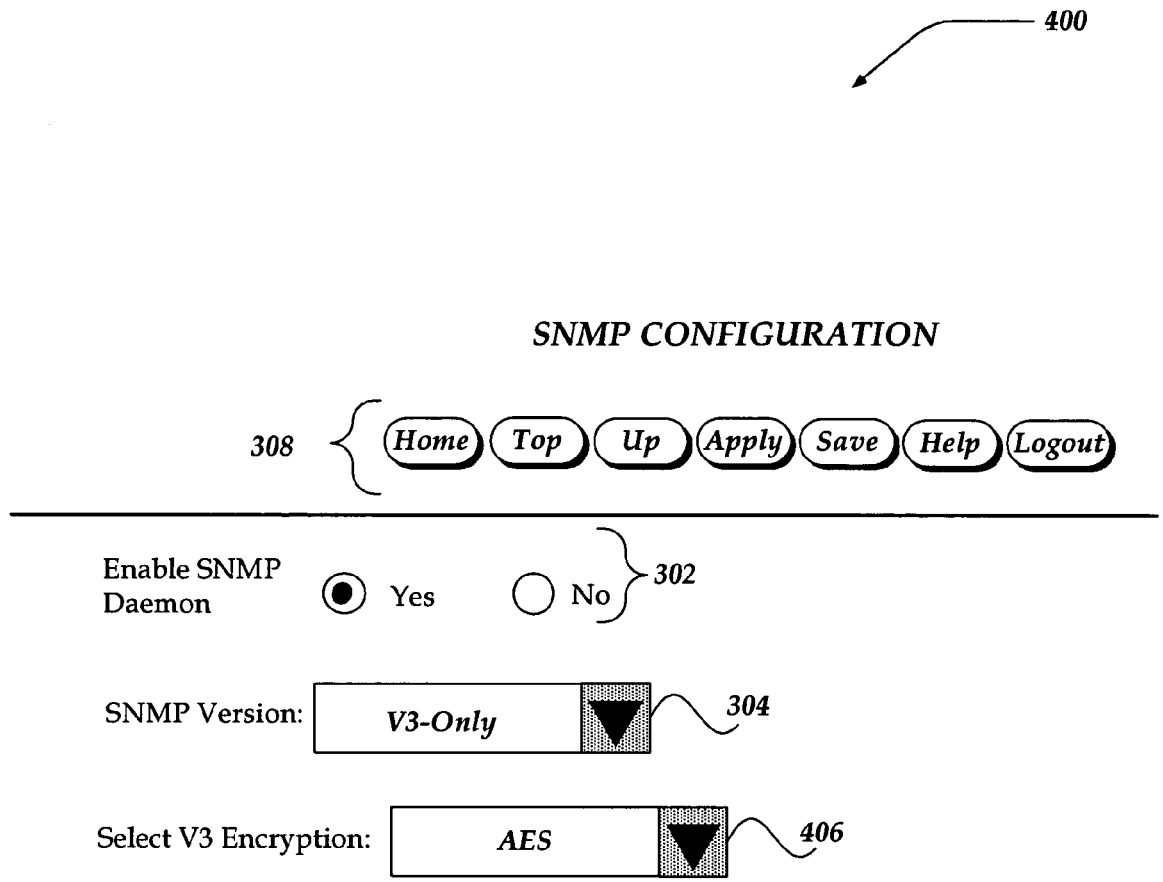
FIG. 4 shows one embodiment of another version selection interface.

Version manager 254 may be configured to enable an administrator interface to select and manage a network management protocol, and the like. In one embodiment, version manager 254 employs a GUI, such as illustrated in FIGS. 3-4. In another embodiment, a CLI is employable to select and manage the network management protocol. Version manager 254 may receive and send information to network manager 252 to direct network manager 252 which network management protocol version is to be employed. Version manager 254 may receive a user input through any of a variety of user interface selection devices, including, but not limited to a keyboard, a pointer, a touch-screen, and the like.

Version manager 254 may also be employed to send and receive information to network manager 252 that includes various parameters, options, and the like, for a selected version. Such parameters, options, and the like, may include, but is not limited to a community string, a security selection, a userid, and the like. Moreover, version manager 254 may be configured to communicate information associated with the selected version to a managed device, such that the managed device may communicate using the selected version. Version manager 254 may employ a process substantially similar to process 500 below to perform its actions.

Although version manager 254 and network manager 252 are illustrated as distinct components, the invention is not so limited. For example, version manager 254 and network manager 252 may be integrated as a single component, distributed as several components, and the like. Moreover, version manager 254 and network manager 252 may reside on the same network device, or be distributed across multiple network devices that are substantially similar to network device 200.

Network device 200 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 200 may further include applications that support virtually any secure connection, including but not limited to TLS, TTLS, EAP, SSL, IPSec, and the like.

Network device 200 also includes input/output interface 224 for communicating with external devices, such as a mouse, keyboard, scanner, or other input devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, client device information, policy, security information including, but not limited to certificates, ciphers, passwords, and the like.

Illustrative Version Selection Interfaces

FIG. 3 shows one embodiment of a version selection interface, usable, for example, in conjunction with version manager 254 of FIG. 2. As shown, interface 300 may include many more components than those shown. The components shown, however, are sufficient to disclose an illustrative embodiment for practicing the invention. It is clear that the arrangement of components, location of the components, orientation of and between components, font type and size employed, and the like, may be varied, without departing from the scope of the invention.

Interface 300 includes interface controls 308, enable/disable select 302, version select 304, and community string controls 306. Interface controls 308 include buttons, controls, and the like, that enable a user to perform a variety of actions, including, but not limited to, navigating through various interface pages, to applying a selection, saving a selection, logging out of a network management interface, and the like.

Enable/disable select 302 is configured to enable the user to toggle on and off a selectable network management protocol. As shown in one embodiment, the network management protocol includes an SNMP daemon.

Version select 304 is configured to enable a selection of at least one version of the network management protocol. Version select 304 is illustrated using a pull-down selection menu, however, the invention is not so limited, and other interface mechanisms may be employed, including a type in field, selectable buttons, and the like. Furthermore, although version select 304 shows selection of SNMP v1/v2 together, the invention is not so limited. For example, SNMP v1 may be selected distinct from SNMP v2. Moreover, it should be clear that while the illustrations, discussions, and processes herein describe selection between SNMP v1, SNMP v2, and SNMP v3, the invention is not limited to merely these versions. As newer versions are available, the invention may be readily configured to accommodate those versions. Thus, for example, should the newer version provide additional parameters, options, and the like, those may be readily and simply illustrated within interface 300 without departing from the scope or spirit of the invention.

Interface 300 further illustrates community string controls 306 as an available option within SNMP v1/v2. Community string controls 306 enable the user to readily select a community string, to disable the community string, and to enter/modify the community string. Briefly, an SNMP community string is employed to enable authenticated access to a Management Information Base (MIB) object, and other management information that may be associated with a managed device, the network manager, and the like. The community string therefore, may operate as a sort of embedded password, providing such access an ability to read substantially all objects in a data store, MIB, and the like, except the community strings, without a write access. Community string controls 306 may further enable read and write access to substantially all objects in a data store, MIB, and the like, but without access to the community strings. Community string control 306 may further enable read and write access to substantially all objects in a data store, MIB, and the like, including the community strings.

FIG. 4 shows an embodiment of another version selection interface usable, for example, by version manager 254 of FIG. 2. As shown, interface 400 may include many more, or less, components than those shown. The components shown, however, are sufficient to disclose an illustrative embodiment for practicing the invention. It is clear that the arrangement of components, location of the components, orientation of and between components, font type and size employed, and the like, may be varied, without departing from the scope of the invention.

Interface 400 includes interface controls 308, enable/disable select 302, version select 304, and encryption select 406. Components numbered similarly to those in FIG. 3 operate in a substantially similar manner. A difference between the interface shown in FIG. 3 and that shown in FIG. 4 is that interface 4 illustrates one embodiment for some of the available options for SNMP v3, while FIG. 3 illustrates one embodiment of some of the available options for SNMP v1/v2. As such, encryption select 406 is illustrated on interface 400 rather than community string controls 306 as made available in FIG. 3. In another embodiment, FIG. 4 does not include encryption select 406.

Encryption select 406 is shown employing a pull down menu to select a type of encryption for use in authentication, however, the invention is not limited to pull down menus, and other user interface mechanisms may be employed, including, but not limited to, a type in field, and the like.

Moreover, although FIGS. 3 and 4 illustrate GUIs, the invention is not limited to merely using GUIs. For example, selection of a version may be performed employing a CLI, and the like. Thus, in one embodiment, a CLI may be employed such as: "SNMP get-v3 . . . -encryption AES," and the like, where " . . . " indicates possible other parameters. Such CLI command line may indicate use of version 3 of SNMP with Advanced Encryption Standard (AES) for the encryption type selected.

Interfaces 300 and 400 of FIGS. 3 and 4, respectively, may be displayed on a display device using any of a variety of mechanisms. For example, the interfaces may be displayed using any of a web-based application, including, but not limited to a browser, an applet, a script, and the like.

Illustrative Operation for Version Selection

Figure 5:
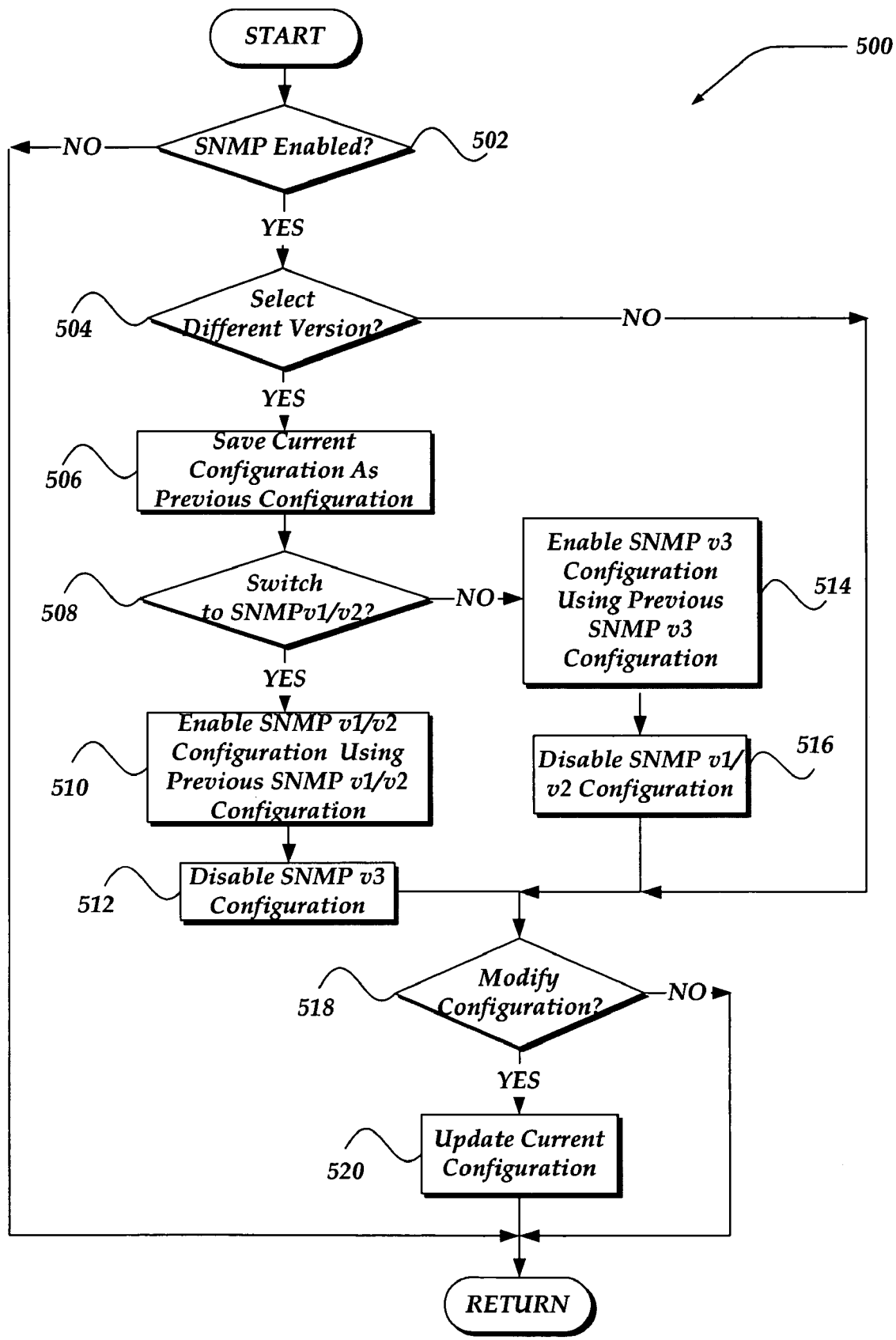
FIG. 5 illustrates a logical flow diagram generally showing one embodiment of a process for managing versions of a network management protocol, such as SNMP, in accordance with the invention.

The operation of certain aspects of the present invention will now be described with respect to FIG. 5. FIG. 5 illustrates a logical flow diagram generally showing one embodiment of a process for managing versions of a network management protocol, such as SNMP, in accordance with the invention. Process 500 of FIG. 5 may be implemented within SVM 106 of FIG. 1. While process 500 is illustrated employing SNMP, the process may employ virtually any network management protocol. Moreover, it should be clear that variations in the selections of versions may be made to process 500 without departing from the scope of the invention. Thus, for example, process 500 may be readily modified to select versions 1 and 2 (SNMP v1 and SNMP v2) separately, rather than together. Additionally, process 500 may be readily expanded to include other versions that illustrated.

Process 500 begins, after a start block, at decision block 502 where a determination is made whether the network management protocol (herein, SNMP) is enabled. If it is determined that SNMP is disabled, processing returns to a calling process to perform other actions. Otherwise, processing continues to decision block 504, where a determination is made whether a version other than the version currently enabled is to be selected. If this is a first entry into process 500, such as when a system is first being configured, then it is presumed that the answer is yes, and processing flows to block 506. If the user determines that the current version enabled is to be retained, processing branches to decision block 518; otherwise, processing flows to block 506.

At block 506, the current configuration is saved as a previous configuration. In one embodiment, this includes saving selected parameters, passwords, community strings, userids, encryption types, and the like, as applicable.

Processing then proceeds to decision block 508, where a determination is made whether the switch of versions is to SNMP v1/v2 (from SNMP v3). If the switch is to SNMP v1/v2, processing flows to block 510. Otherwise, the switch is considered to be to SNMP v3 from SNMP v1/v2, in which instance, processing branches to block 514.

At block 510, SNMP v1/v2 is configured to using the previous SNMP v1/v2 protocol and associated configuration, including any user set parameters, options, and the like. In one embodiment, information about the selected version is provided to a managed device, another component, and the like. Additionally, a GUI may be configured to display SNMP v1/v2 parameters, options, and the like. In one embodiment, the GUI is substantially similar to that illustrated in FIG. 3. In another embodiment, a CLI is configured to enable selection of SNMP v1/v2 parameters, options, and the like. Upon completion of block 510, processing continues to block 512, where SNMP v3 parameters, options, and the like are disabled. In one embodiment, the GUI inhibits the selection of SNMP v3 parameters, options, and the like, in part, by not displaying them. Processing then proceeds to decision block 518.

At block 514, SNMP v3 is configured to employ the previous SNMP v3 protocol and associated configuration, including any user set parameters, options, and the like. In one embodiment, information about the selected version is provided to a managed device, another component, and the like. Additionally, a GUI may be configured to display SNMP v3 parameters, options, and the like. In one embodiment, the GUI is substantially similar to that illustrated in FIG. 4. In another embodiment, a CLI is configured to enable selection of SNMP v3 parameters, options, and the like. Upon completion of block 514, processing continues to block 516, where SNMP v1/v2 parameters, options, and the like are disabled. In one embodiment, the GUI inhibits the selection of SNMP v1/v2 parameters, options, and the like, in part, by not displaying them. Processing then proceeds to decision block 518.

At decision block 518, a determination is made whether the currently available network management protocol configuration, including parameters, options and the like are to be modified. If it is determined that the configuration is to be modified, processing proceeds to block 520, where the configuration is modified using the GUI, CLI, and the like. In one embodiment, the modified information about the selected version is provided to a managed device, another component, and the like. In the event that it is determined that no modifications are to be performed, or upon completion of block 520, processing returns to the calling process to perform other actions.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method comprising:
providing an interface configured to enable selecting from a plurality of versions of a network management protocol;
using the interface to select a first version of the network management protocol from the plurality of versions;
providing, through the interface, an option associated with the selected first version;
inhibiting access within the interface to another option associated with another version of the network management protocol within the plurality of versions; and
saving a configuration associated with the first version, wherein the configuration is based, in part, on a selection of the provided option.

2. The method of claim 1, wherein the network management protocol comprises at least one of a common management information protocol, high-level entity management systems and a simple network management protocol.

3. The method of claim 1, further comprising:
using the interface to select a second version of the network management protocol from the plurality of versions;
providing, through the interface, a second option associated with the selected second version;
inhibiting within the interface to the option associated with the first version; and
saving another configuration associated with the second version, wherein the another configuration is based, in part, on a selection of the provided second option.

4. The method of claim 3, further comprising:
using the interface to reselect the first version of the network management protocol from the plurality of versions;
inhibiting access within the interface to the second option associated with the second version; and
restoring the saved configuration associated with the first version, including the selected option associated with the first version.

5. The method of claim 1, wherein the interface further comprises:
at least one of a graphical user interface, a command line interface, an application interface, an applet, and a script.

6. The method of claim 1, wherein the plurality of versions of the network management protocol comprises at least one of a simple network management protocol v1, a simple network management protocol v2, and a simple network management protocol v3.

7. The method of claim 1, wherein the providing an option comprises providing at least one of a community string option and an encryption option.

8. The method of claim 1, wherein the selected first version comprises one of a simple network management protocol v1/v2 and a simple network management protocol v3.

9. A method comprising:
providing a graphical user interface employable for selecting from a plurality of versions of simple network management protocol;
using the graphical user interface to select a first version of simple network management protocol from the plurality of versions;
providing within the graphical user interface a first option associated with the selected first version;
inhibiting access within the graphical user interface to another option associated with another version of simple network management protocol within the plurality of versions;
saving a first configuration associated with the first version, wherein the first configuration is based, in part, on a selection of the first option;
using the graphical user interface to select a second version of simple network management protocol from the plurality of versions;
providing within the graphical user interface a second option associated with the selected second version;
inhibiting access within the graphical user interface to the first option associated with the first version;
saving a second configuration associated with the second version, wherein the second configuration is based, in part, on a selection of the second option;
using the graphical user interface to reselect the first version of simple network management protocol from the plurality of versions;
inhibiting access within the graphical user interface to the second option associated with the second version; and
restoring the first configuration associated with the first version, including the first option.

10. The method of claim 9, wherein the first version comprises a selection from one of simple network management protocol v1, simple network management protocol v2, simple network management protocol v1/v2, and simple network management protocol v3.

11. The method of claim 9, wherein the graphical user interface is browser-based.

12. The method of claim 9, further comprising:
sending at least a portion of the first configuration to a simple network management protocol agent.

13. An apparatus comprising:
a transceiver configured to receive and send information to a managed device; and
a version manager configured to
provide an interface configured to enable selection of a plurality of versions of a network management protocol,
receive a selection of a first version of the network management protocol from the plurality of versions,
provide, through the interface, an option associated with the selected first version,
inhibit access within the interface to another option associated with another version of the network management protocol within the plurality of versions,
save a configuration associated with the first version based, in part, on a selection of the provided option, and
send information associated with the option and the selected version to another component, wherein the another component is operable to employ the selected version of the network management protocol.

14. The apparatus of claim 13, wherein the network management protocol comprises at least one of a common management information protocol, high-level entity management systems and a simple network management protocol.

15. The apparatus of claim 13, wherein the plurality of versions of the network management protocol comprises at least one of a simple network management protocol v1 a simple network management protocol v2, and a simple network management protocol v3.

16. The apparatus of claim 13, wherein the other component comprises at least one of a network manager and a network agent.

17. The apparatus of claim 13, wherein the option associated with the selected first version comprises at least one of community string option and an encryption option.

18. A computer program embodied on a computer readable medium, the computer program configured to control a processor to perform operations comprising:
retrieving a set of menu entries configured to enable selecting from a plurality of versions of a network management protocol;
displaying a menu on a display, the menu comprising a set of menu entries;
receiving a menu entry selection signal indicative of the user interface selection device indicating a selection of a first version of the network management protocol from the plurality of versions;
displaying on the display an option associated with the selected first version of the network management protocol;
inhibiting access within the graphical user interface to another option associated with another version of the network management protocol within the plurality of versions;
receiving information associated with the option on the display, and displaying the received information;
enabling a determination of a configuration of the first version of the network management protocol, based on the received information; and
enabling the configuration associated with the first version to be tracked.

19. The computer program of claim 18, wherein the network management protocol comprises at least one of a common management information protocol, high-level entity management systems and a simple network management protocol.

20. The computer program of claim 18, wherein the plurality of versions of the network management protocol comprises at least one of a simple network management protocol v1, a simple network management protocol v2, and a simple network management protocol v3.

21. The computer program of claim 18, wherein the providing an option comprises providing at least one of a community string option and an encryption option.

22. An apparatus comprising:
an interface means for selecting from a plurality of versions of a network management protocol;
a selecting means for selecting a first version of the network management protocol from the plurality of versions;

a providing means for providing an option associated with the selected first version;

an inhibiting means for inhibiting access to another option associated with another version of the network management protocol within the plurality of versions; and a saving means for saving a configuration associated with the first version, wherein the configuration is based, in part, on a selection of the provided option.

* * * * *